United States Patent [19]

Muehlenbein

[11] 4,433,486
[45] Feb. 28, 1984

[54] MEASURING INSTRUMENT FOR COMPRESSIBLE OBJECTS

[75] Inventor: James A. Muehlenbein, Villa Park, Ill.

[73] Assignee: Novel Products, Inc., Addison, Ill.

[21] Appl. No.: 373,843

[22] Filed: May 3, 1982

[51] Int. Cl.³ .......................... G01B 3/10; G01L 5/06
[52] U.S. Cl. .................................... 33/137 R; 33/179; 73/862.42
[58] Field of Search ........................ 73/862.39, 862.42; 116/212, DIG. 34; 33/137 R, 179

[56] References Cited

U.S. PATENT DOCUMENTS

| | | |
|---|---|---|
| 650,389 | 5/1900 | Hatfield ............................ 33/137 R |
| 740,943 | 10/1903 | Summersby et al. . |
| 1,011,628 | 12/1911 | Klein . |
| 1,096,206 | 5/1914 | Thomas . |
| 1,238,841 | 9/1917 | Snider . |
| 1,305,780 | 6/1919 | Dilks . |
| 2,157,723 | 5/1939 | Wilson . |
| 3,370,458 | 2/1968 | Dillon .......................... 73/862.62 X |
| 3,432,930 | 3/1969 | Ljungberg . |
| 3,744,140 | 7/1973 | Kyrk . |

FOREIGN PATENT DOCUMENTS 834469 5/1960 United Kingdom ............. 33/137 R

Primary Examiner—Charles A. Ruehl
Attorney, Agent, or Firm—Wood, Dalton, Phillips, Mason & Rowe

[57] ABSTRACT

An instrument for measuring the girth of compressible objects comprising a graduated tape and a one-piece tension reading member. The tension reading member is substantially planar and comprises first and second sections interconnected by a reduced cross-sectional bendable hinge portion which permits relative movement of the first and second sections in the plane of the member. The first section is secured with the tape and controlled by grasping and drawing the tape with one hand. The second section is drawn in an opposite direction by the other hand, thereby tensioning the tape and deforming the hinge portion. The tension applied to the tape is indicated by the relative positions of the first and second portions and preferably by aligned scales on each. The first portion has an arm which is extensible within a corresponding cutout in the second section. The arm has an expanded end which engages a pair of stops protruding into the cutout to revent overstressing of the hinge portion.

14 Claims, 4 Drawing Figures

U.S. Patent  Feb. 28, 1984  4,433,486
FIG. 1
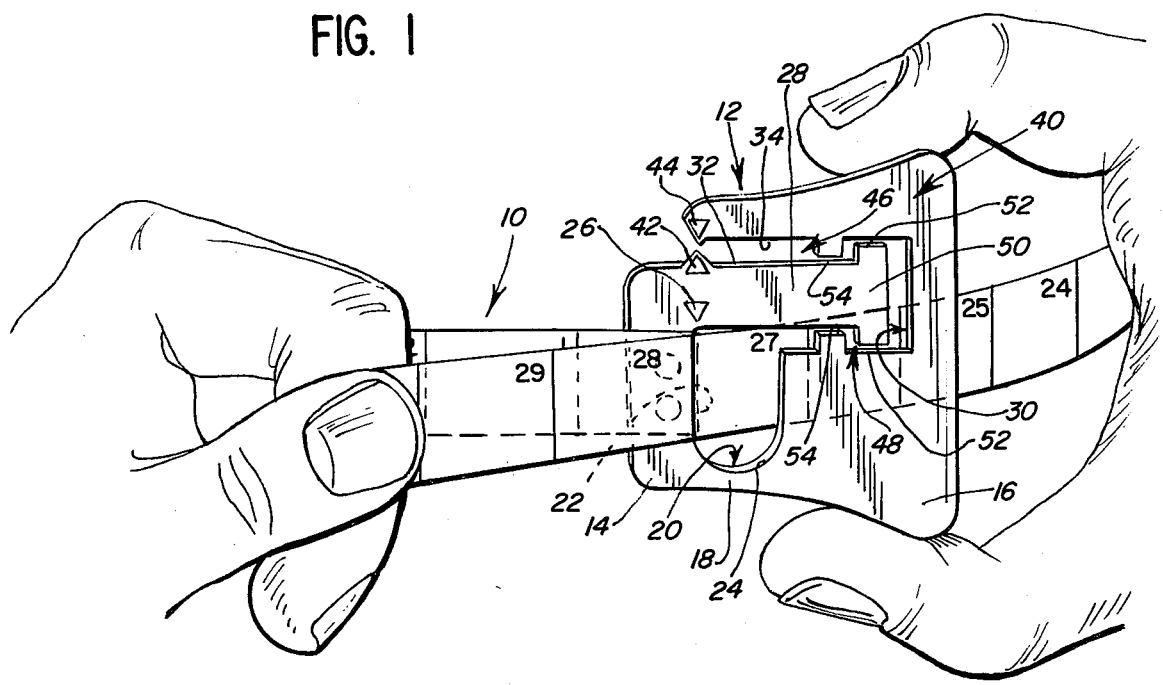
FIG. 2
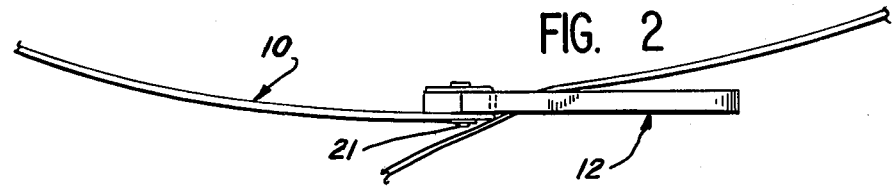
FIG. 3
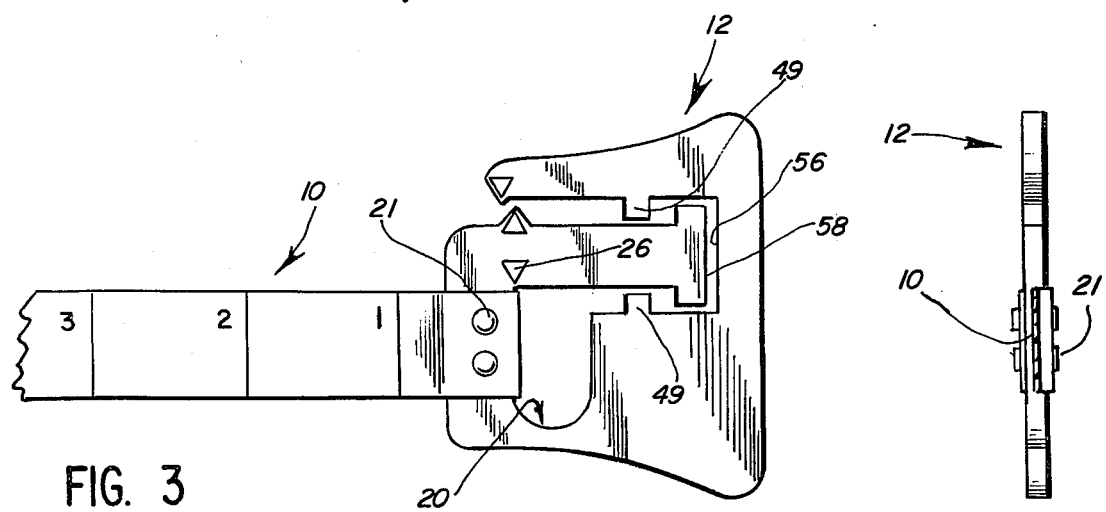
FIG. 4

MEASURING INSTRUMENT FOR COMPRESSIBLE OBJECTS

BACKGROUND OF THE INVENTION

When measuring the girth of compressible objects, it is desirable to maintain a uniform tension upon a tape or the like that is extended about the object. For example, when measuring human limbs as part of a weight reduction program, meaningful dimensional comparisons can be made only if measurements are taken with a uniform applied tension on the measuring tape.

Heretofore mechanisms have generally been constructed incorporating coil springs or the like. The springs are deformed depending upon the tension applied to the measuring tape. With the spring compressed a predetermined amount, the tension on the tape can be readily determined.

The main drawback with the prior art apparatus is that they are relatively complicated in construction and generally require the assembly of numerous interacting elements. Also, ease of handling has not particularly aided accurate readings to be obtained.

The present invention is specifically directed to overcoming these prior problems.

SUMMARY OF THE INVENTION

The present invention is an instrument for measuring the girth of compressible objects and comprises a flexible tape for extension about an article to be measured, and a tension reading member. The tension reading member comprises first and second sections and a flexible, bendable hinge portion interconnecting the same and permitting relative movement between the sections.

The first section is secured with the end of the tape. The first section is controlled by grasping and drawing the tape with one hand. The second section is drawn by applying a force with the other hand oppositely that on the tape, deforming the hinge portion and shifting the second section relative to the first section. The relative positions of the first and second sections indicates the degree of tension applied to the tape.

It is the principal object of the present invention to provide a simplified mechanism for uniformly tensioning a measuring tape.

In a preferred form of the invention the tension reading member is fabricated as a single-piece in a substantially flat configuration and from a resilient material. The portion interconnecting the first and second sections has a reduced cross-sectional area which permits relative flexure of the first and second sections substantially in the plane of the member. The member can thus be simply molded as from plastic or the like and, because of its minimal thickness, is an unobtrusive apparatus.

To take readings from the tension reading member, a pair of elongate edges are defined on each of the first and second sections and arranged substantially parallel and adjacent to each other. At least one readily visible indicating mark is included adjacent each edge, which marks align at a predetermined tension. Measurements under consistent tension can be made rapidly by consistently aligning the indicating marks through successive measurements.

In a preferred form of the invention an opening is defined in the tension reading member through which the tape is extensible. The opening is preferably U-shaped, with a straight edge defined transverse to the length of the tape, upon which edge the tape is guided as it is drawn taut about an object.

One of either the first or second sections has a cutout, with the other of either the first or second sections having an arm which is extensible within the cutout. In a preferred form, a pair of stops protrude into the opening and engage an expanded portion of the arm to prevent overextension as might damage the flexible hinge portion interconnecting the first and second sections.

To facilitate grasping of the tension reading member, the second portion is formed with two diverging edges defining an expanded portion which can be conveniently maintained between the thumb and finger of the user. This assures that a positive grip is maintained as the second section is manipulated. Also the arrangement of parts is such that drawing the tape taut exerts only even pull on the tension reading member avoiding off-center forces which might make handling more difficult.

BRIEF DESCRIPTION OF THE DRAWINGS

FIG. 1 is a sectional perspective view of a measuring instrument constructed in accordance with the present invention with the measuring tape drawn to a predetermined tension and illustrative manipulation shown fragmentally;

FIG. 2 is a top sectional view of the measuring instrument in FIG. 1;

FIG. 3 is an elevated sectional view of the measuring instrument with the measuring tape in a relaxed state;

FIG. 4 is an elevated side view of the measuring instrument.

DETAILED DESCRIPTION OF THE DRAWINGS

A preferred form of the invention is illustrated in FIGS. 1–4 and comprises generally a flexible measuring tape 10, with graduations along its length, and a substantially planar tension reading member, indicated generally at 12. The tape itself is generally of material not subject to appreciable nor significant elongation under the force magnitudes employed.

The tension reading member 12 comprises a first and second sections, 14 and 16 respectively, interconnected by a flexible bendable hinge portion 18 having a reduced cross-sectional area, transverse to the length of the tape, that permits relative flexing of the first and second sections 14, 16 in the plane of the member 12. The flexible hinge portion is only bendable within the elastic limits of the material of which the member 12 is molded or made. Flexibility as related to the hinge portion is meant to describe the fact that bending of the material is concentrated in the hinge 18 area with the ability of the material to spring back to its original position upon release of tension on the tape 10. In a preferred form, the member 12 is fabricated as a single piece from a material that is rigid enough to maintain the first and second sections in relatively fixed relationship, yet which is deformable at the hinge 18 under a predetermined force, with the hinge dimensions and material chosen accordingly.

A U-shaped opening 20 is provided in the member and defines a straight edge 22 transverse to the length of the tape 10. The end of the tape is extended around the first section 14 and over the edge 22 and doubled back and secured as by rivets 21. The tape 10 slides over the edge 24 as it is drawn through the opening and tightened about an article. The width of the opening 20 is chosen to minimize binding of the tape with the opposing edges of the opening 20 when drawn through as in FIGS. 1 and 2. The curved bottom edge 24 of the opening serves to guide the tensioned tape toward the edge 22 so that the tape is consistently positioned when the measurements are taken. An inverted triangular mark 26 is situated immediately above the top of the edge 22 and aligns with the graduations on the tape to clearly indicate the desired measurement.

The first section 12 has an arm 28 extending substantially parallel to the length of the tape 10. A U-shaped cutout 30 in the second section 16 opens toward the first section 14 and receives the arm 28. The upper edge 32 of the arm 28 is substantially parallel to the edge 34 of the second section 16 defining the cutout 30.

To take a measurement, the tape is extended about an article (not shown) and outwardly through the opening 20. The second section is grasped between the thumb and index finger on one hand, as illustrated in FIG. 1, and the tape drawn taut by the other hand. To accommodate the one hand with the member 12, the upper and lower edges 36,38 of the second section 16 diverge towards one side defining an expanded head 40 which prevents the hand from slipping when the tape is tightened. The tape is tensioned by exerting opposing forces on the tape and the second section, thereby deforming the hinge portion 18 and shifting the arm 28 from the relaxed position in FIG. 3 towards the left, relative to the cutout, as in FIG. 1. It may be observed that the tape connection through the rivets 21 places the pull on the tape centrally aligned with the resistant force of a person's thumb and finger retention applied to the section 16. No skewing force is applied to impede accurate readings in any position about any limb of a patient.

A pair of indicating marks 42, 44 extend respectively from the first and second sections and into the space 46 therebetween. Consistant tension can be applied to the tape by aligning the marks 42,44 as successive measurements are taken. Additional marks can be provided on either of the first and/or second sections if different tensions are desired. With the marks 42,44 aligned, the measurement is clearly indicated by the lower mark 26 above the tape 10.

To prevent overstressing of the hinge 18, a stopping arrangement 48 is constructed by a cooperative arrangement of the first and second sections. The arm 28 is expanded at its end as to form a T-shape. Extending from opposite edges of, and into the cutout are a pair of stops 49 integrally constructed with the second section. The stops abut the expanded end 50 of the arm preferably before the hinge is stressed beyond its elastic limit.

The horizontal edges 52, 54 of the arm end 50 and stop, respectively, maintain the arm substantially centered and guide the arm within the cutout. The edge 56 of the cutout serves as a stop for the vertical edge 58 at the end of the arm. The arrangement of the stop 49, the expanded arm end 50 and the edge defining the cutout, prevents overextension of the hinge 18 in all directions in the plane of the tension reading member 12.

The foregoing description was made for purposes of clarifying the operation of the invention, with no limitations to be derived therefrom. The scope of the invention is to be ascertained from the appended claims.

I claim:

1. An instrument of measuring the girth of compressible articles under uniform tension, said instrument comprising:

a flexible tape for extension about an article and having graduations along its length; and a one-piece tension reading member comprising first and second sections, said first section being fixedly secured with said flexible tape;

said tension reading member having a flexible, bendable hinge portion interconnecting said first and second sections and permitting relative movement of said first and second sections, each to the other;

whereby the indication of the tension applied to the article by the flexible tape is determinable from the relative position of the first and second sections with said tape and attached first section drawn in one direction and said second section drawn oppositely to said one direction.

2. The instrument of claim 1 wherein said first and second sections each include an elongate edge which edges are in substantially parallel relationship with each other, and at least one indicating mark adjacent each said edge, said marks aligning with each other when said flexible tape is drawn about an article under a predetermined tension.

3. The instrument of claim 1 wherein one of either the first or second section has a cutout and the other of either the first or second section has an arm which is extensible within said cutout, the position of said arm within said cutout determined by the tension applied to the flexible tape.

4. The instrument of claim 3 wherein at least one stop protrudes within said cutout and said arm has an expanded end portion which abuts said stop so as to prevent overstressing of said flexible hinge portion.

5. An instrument for measuring the girth of compressible articles under uniform tension, said instrument comprising:

a flexible tape for extension about an article and having graduations along its length;

a substantially planar tension reading member comprising a first and second section, said first section secured with said flexible tape;

a flexible bendable hinge portion interconnecting said first and second sections and permitting relative movement of said first and second sections substantially within the plane of the tension reading member by bending of the material of such hinge portion;

said first and second sections defining therebetween an opening through which said flexible tape can be extended, the tension of the flexible tape being determinable by observing the relative positions of said first and second sections with said tape and second portion drawn away from each other.

6. The instrument of claim 5 wherein said flexible portion has a reduced cross-sectional area, transverse to the length of the tape, from the cross-sectional area of either said first or second sections on either side and in the vicinity thereof so as to permit relative movement of said first and second sections.

7. The instrument of claim 6 wherein said tension reading member is formed as a single piece and from a resilient material such that relative elastic flexing can occur between said first and second sections.

8. An instrument for measuring the girth of compressible articles under uniform tension, said instrument comprising:

a flexible tape for extension about an article and having graduations along its length;

a one-piece tension reading member comprising a first and second section, said first section being fixedly secured with said flexible tape;

a flexible hinge portion between said first and second sections and permitting relative movement therebetween in proportion to the amount of tension applied in a direction tending to separate said sections;

a substantially U-shaped cutout in said second section and opening towards said first section;

an arm on said first section and extensible within said cutout;

said second section having spaced diverging edges defining an expanded portion which can be conveniently grasped and by which said second section can be manipulated to tension the tape about an article to be measured, the applied tension being determinable from the position of said arm within the cutout.

9. The instrument of claim 8 wherein an opening is formed in said tension reading member and said tape is extensible through said opening when measuring an article.

10. The instrument of claim 9 wherein a portion of said opening is defined by a straight edge having a length at least equal to the width of the tape, said straight edge serving to guide said tape as the tape is drawn through the opening.

11. The instrument of claim 9 wherein said opening is substantially U-shaped and defined partially by a straight edge extending transversely of the length of said tape, said U-shaped opening defining said flexible portion which is of a reduced cross-sectional area with a curved edge of said opening serving to guide said tape against said straight edge when the tape is drawn through the opening, said straight edge providing a smooth guiding surface for said tape and assuring that said tape is uniformly located relative to said tension reading member for consistent tension readings.

12. The instrument of claim 8 wherein said instrument is formed as a single piece from a resilient material and said flexible portion is of a reduced cross-sectional area to permit relative movement of said first and second sections.

13. The instrument of claim 8 wherein at least one indicating member is included on each said first and second sections, said marks aligning with each other when a predetermined tension is applied to said tape.

14. The instrument of claim 8 wherein a pair of stops protrude into the cutout and said arm has an expanded end which abuts said stops to prevent overstressing of said flexible portion.

* * * * *